United States Patent
Selander et al.

(10) Patent No.: US 9,674,219 B2
(45) Date of Patent: Jun. 6, 2017

(54) AUTHENTICATING PUBLIC LAND MOBILE NETWORKS TO MOBILE STATIONS

(71) Applicant: Telefonaktiebolaget L M Ericsson (publ), Stockholm (SE)

(72) Inventors: Göran Selander, Bromma (SE); Harald Kallin, Sollentuna (SE); Michael Liljenstam, Cupertino, CA (US); Gunnar Mildh, Sollentuna (SE); Bernard Smeets, Dalby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 56 days.

(21) Appl. No.: 14/652,864

(22) PCT Filed: Dec. 17, 2012

(86) PCT No.: PCT/EP2012/075835
§ 371 (c)(1),
(2) Date: Jun. 17, 2015

(87) PCT Pub. No.: WO2014/094822
PCT Pub. Date: Jun. 26, 2014

(65) Prior Publication Data
US 2015/0334566 A1    Nov. 19, 2015

(51) Int. Cl.
*H04M 1/66* (2006.01)
*H04L 29/06* (2006.01)
(Continued)

(52) U.S. Cl.
CPC ........ *H04L 63/1466* (2013.01); *H04L 9/3247* (2013.01); *H04W 4/14* (2013.01);
(Continued)

(58) Field of Classification Search
CPC ..... H04W 12/06; H04W 12/04; H04W 12/08; H04W 12/10; H04W 12/12; H04W 8/04;
(Continued)

(56) References Cited

U.S. PATENT DOCUMENTS

2007/0204160 A1    8/2007  Chan et al.
2007/0255841 A1*  11/2007  Chong ................ H04L 63/0807
                                                709/229
(Continued)

FOREIGN PATENT DOCUMENTS

EP          1051053 A2      11/2000

OTHER PUBLICATIONS

3GPP, "3rd Generation Partnership Project; Technical Specification Group Services and System Aspects; Generic Authentication Architecture (GAA); Generic Bootstrapping Architecture (GBA) (Release 11)", 3GPP TS 33.220 V11.4.0, Sep. 2012, 1-92.
(Continued)

*Primary Examiner* — Kwasi Karikari
(74) *Attorney, Agent, or Firm* — Patent Portfolio Builders, PLLC

(57) ABSTRACT

There is provided a method of authenticating a public land mobile network (PLMN) to a mobile station (MS). The PLMN provides a circuit switched access network to the MS, and the MS and a trusted service, TS, have established a security context. The initiation of a voice call or initiation of sending or receiving of a pushed message by the MS (S10.1) is detected, and the TS generates a response authentication token using a session identifier and the security context (S10.7). The TS sends a response comprising the response authentication token to the MS such that the response is delivered to the MS over a signalling channel of the PLMN using a mobile subscriber integrated services digital network-number (MSISDN) associated with the sub-
(Continued)

scriber or subscription to direct the message (S10.9). The MS authenticates the response using the response authentication token, the security context, and the session identifier (S10.12) in order to authenticate the PLMN.

31 Claims, 10 Drawing Sheets

(51) Int. Cl.
    *H04L 9/32*     (2006.01)
    *H04W 4/14*     (2009.01)
    *H04W 12/06*     (2009.01)
    *H04W 12/12*     (2009.01)
    *H04W 4/22*     (2009.01)

(52) U.S. Cl.
    CPC ........... *H04W 12/06* (2013.01); *H04W 12/12* (2013.01); *H04W 4/22* (2013.01)

(58) Field of Classification Search
    CPC ... H04L 9/3271; H04L 63/08; H04L 63/0869; H04L 2463/061; H04L 63/0428; H04L 63/0823; H04L 67/26; H04L 63/105
    USPC .......................................................... 455/411
    See application file for complete search history.

(56) References Cited

U.S. PATENT DOCUMENTS

| | | | |
|---|---|---|---|
| 2008/0086564 A1* | 4/2008 | Putman ................... | H04L 29/06 709/227 |
| 2011/0265172 A1* | 10/2011 | Sharma ............... | H04L 63/0815 726/8 |
| 2012/0230488 A1 | 9/2012 | De Los Reyes | |

OTHER PUBLICATIONS

3GPP, "3rd Generation Partnership Project; Technical Specification Group Services and System Aspects; Generic Authentication Architecture (GAA); Generic Bootstrapping Architecture (GBA) Push function (Release 11)", 3GPP TS 33.223 V11.0.0, Sep. 2012, 1-23.

3GPP, "3rd Generation Partnership Project; Technical Specification Group Services and System Aspects; Generic Authentication Architecture (GAA); Generic Bootstrapping Architecture (GBA) Push Layer (Release 11)", 3GPP TS 33.224 V11.0.0, Sep. 2012, 1-21.

* cited by examiner

AUTHENTICATING PUBLIC LAND MOBILE NETWORKS TO MOBILE STATIONS

FIELD OF INVENTION

The present invention relates to authenticating Public Land Mobile Networks or their components to mobile stations. In particular, it relates to the case where the Public Land Mobile Network comprises a Circuit Switched access network, for example a GSM network.

BACKGROUND

In a Public Land Mobile Network (PLMN) conforming to the GSM architecture, information sent over dedicated channels is encrypted between the mobile station (MS, e.g. a user's device) and the base station. This encryption is performed on a radio frame level (i.e. physical layer) using keys that have been generated by the Subscriber Identity Module (SIM) during the initial authentication when the MS attaches to the GSM network. Once encryption is established, all information is encrypted in the same way. There is no encryption on common channels such as broadcast, paging or random access channels.

Exemplary signalling required to set up encryption is shown in FIG. 1. To set up a dedicated channel, the MS performs the Radio Resource (RR) connection establishment procedure (1.1). This can be triggered for several reasons, but is always initiated by the MS:

The MS receives a page for an incoming SMS or voice call.
The MS initiates an outgoing SMS or voice call.
The MS wants to perform some signalling (such as location area updates).

The procedure is initiated by the MS sending a "channel request" message on a common channel. The PLMN responds with an "immediate assignment" message, specifying a dedicated channel to use for further signalling. It is this channel which is used to set up encryption.

The MS sends information to the GSM network about its encryption capabilities as part of the MS Classmark 1-3 information elements (1.2). This includes the MS's support for the encryption algorithms in GSM, of which A5/0 to A5/3 are used for voice traffic. A5/0 is null encryption (i.e. the call is sent as plaintext), and A5/1 and A5/2 have been shown to be breakable in practical attacks unless additional measures such as plaintext randomisation are performed. The transfer of these encryption capabilities is itself not encrypted. This information is used by the PLMN to determine which algorithm should be used; normally the strongest supported by both the base station and the MS (1.3).

The PLMN enables encryption by sending a "CIPHERING MODE COMMAND" to the MS indicating "ciphered" and the encryption to be used (1.4). The MS responds with a "CIPHERING MODE COMPLETE" command sent using the encryption (1.5), and all further communication is encrypted (1.6) until either the MS leaves dedicated mode (i.e. no longer requires the dedicated channel), or the encryption is switched off or modified by the PLMN using another "CIPHERING MODE COMMAND" or a "HANDOVER COMMAND". Encryption on a dedicated channel can only be switched off by a message that is itself encrypted.

In a GSM network, the PLMN can authenticate the MS and SIM (e.g. to confirm that the SIM is allowed to use the PLMN). However, in contrast to third and fourth generation architectures, there is no facility in the GSM standards for the MS to authenticate the PLMN (i.e. to confirm which PLMN it is attached to, or to confirm the identity of a base station in that PLMN). This allows attackers to potentially intercept traffic from mobile stations using a false base station.

The attacker causes the intended victim to connect to a false base station, rather than an authentic base station, by having the false base station broadcast at high power, or be set up close to the intended target, such that it provides a stronger signal than an authentic base station. [The victim's MS will only connect to the false base station when it is first turned on, or when it is coming out of "idle mode", i.e. it does not currently have a dedicated channel, as handovers are handled by the network in such a way that the MS would not connect to a false base station.] Once the MS is connected to the false base station, the attacker can manipulate the signalling during the RR establishment procedure in order to use weak encryption algorithms or no encryption at all. This allows information sent over the connection, including calls and SMS messages, to be recorded and deciphered, or simply recorded if no encryption was used.

There are two attack scenarios considered herein, which differ primarily in how information intercepted by the false base station is transmitted afterwards.

In a "fake network" (FN) attack, the attacker sets up a "backhaul" through which outgoing calls and SMS messages can be routed. This could, for example, be a voice over Internet Protocol (VoIP) service and an internet connection. Caller ID spoofing and SMS sender spoofing are used to ensure that the recipient of the voice call or SMS sees it as coming from the victim. As the victim's MS is not connected to the authentic PLMN, incoming calls and SMSs sent to his mobile subscriber digital network-number (MSISDN) cannot be routed to the MS, though the attacker can send his own SMSs and incoming calls to the MS. This type of attack has been demonstrated to work against GSM networks, e.g. at Defcon 2010, "Practical Cellphone Spying"—Chris Paget.

To identify the intended victim, the IMSI of that victim's MS should be known to the attacker, to allow the fake base station to reject connection attempts by other MSs, either by not providing service or by signalling that the base station is not available.

In a "man-in-the-middle" (MITM) attack, the attacker sets up a false base station which is connected to a mobile station controlled by the attacker. The attacker's MS is configured to connect to an authentic base station, and relays all traffic associated with the victim's MS between the false base station and the authentic base station. When the victim's MS sends information to the network about its encryption capabilities, the attacker modifies this information so that it appears that the MS only supports weak or null encryption, thus ensuring that future traffic is sent in a form that can be intercepted and deciphered. Such a device is described in the European patent EP 1051053.

For both attack cases, the attack will only function on a network in which the MS cannot authenticate the base station, such as a GSM network. In the case of networks supporting third (e.g. 3G/UMTS) and fourth generation technologies (4G/LTE), GSM may also be supported in order to ensure backwards compatibility with legacy GSM terminals. For terminals supporting GSM as well as third and/or fourth generation technologies, an attacker may jam all but the GSM signals to allow one of the above attacks to succeed.

A more detailed description will now be given of each attack.

A "fake network" attack proceeds as follows, with reference to FIG. 2:

The attacker sets up a false base station with some communication "backhaul" that will allow voice calls and SMS messages sent through the base station to be completed (however, since the MS is not registered on its own network, incoming voice calls cannot be directed to it and so will fail). This base station is set up close to the victim and/or transmitting with high power to cause terminals to connect to it as it provides the strongest signal (2.1).

The victim's terminal either attaches to the false base station on power up, or connects to it when coming out of idle mode as it offers the best radio conditions. Other terminals in the area may be given a "registration failed" message by the false base station, causing them to connect to the next best signal (usually the real base station), or allowed to connect, but not able to route calls or other signalling. Alternatively, the false basestation may relay calls from the other terminals, but choose not to record them. To perform this, the network, and ideally the IMSI (International Mobile Subscriber Identifier) of the target MS should be known. Knowing the network allows the false base station to broadcast a signal that the MS will connect to, and knowing the IMSI allows it to filter out other connections, and only monitor the communications from the target MS.

The victim initiates, for example, a voice call. Following the RR establishment procedure, the false base station either omits to enable encryption, or else enables A5/0 (null) encryption (2.4). The transmissions by the MS (2.5) are recorded by the false base station (2.6), and sent on through the "backhaul" (2.7). The victim may or may not have a warning symbol displayed on the terminal to state that there is no encryption, depending on the terminal implementation.

A "Man in the Middle" attack proceeds as follows, with reference to FIG. 3:

The attacker sets up a false base station that uses a second radio link, by using a modified MS or similar, to connect to the victim's PLMN masquerading as the victim's MS. As in the previous case, this base station is set up close to the victim and/or transmitting at high power, to ensure that the victim's MS connects to it. The modified MS is configured to ignore the false base station, or vice versa, to ensure that it can connect to the real PLMN. In this way, the attacker can interpose itself between the network and the victim's MS to act as a man-in-the-middle (3.1).

The victim's terminal either attaches to the false base station on power up, or connects to it when coming out of idle mode as it offers the best radio conditions. Other terminals in the area may be given a "registration failed" message by the false base station, causing them to connect to the next best signal (usually the real base station), or allowed to connect, but not able to route calls or other signalling. Alternatively, the false basestation may relay calls from the other terminals, but choose not to record them. To perform this, the network, and ideally the IMSI (International Mobile Subscriber Identifier) of the target MS must be known. Knowing the network allows the false base station to broadcast a signal that the MS will connect to, and knowing the IMSI allows it to filter out other connections, and only monitor the communications from the target MS.

The victim initiates, for example, a voice call. The RR establishment procedure happens as normal, and is routed via the fake base station (3.2). When the victim's MS is negotiating the encryption (3.3), the attacker modifies the information sent to make it appear that the victim's MS supports only weak or null encryption (3.4). The PLMN therefore concludes that the best available encryption is this weak or null encryption (3.5), and sends a CIPHERING MODE COMMAND indicating that this is the encryption to be used (3.6). The victim's MS now transmits using this weak or null encryption (3.8), allowing the fake base station to record the communications to and from the MS (3.9), and act as a relay between the MS and the PLMN (3.10) so that the victim does not experience anything different to normal. The victim may or may not have a warning symbol displayed on the terminal to state that there is no encryption, depending on the terminal implementation.

The only known solutions to these attacks within the context of a GSM architecture involve making changes to the hardware or firmware layers of the terminals, e.g. to change the security protocol to include authentication of the network, or to introduce behaviour forbidding communications (except for the establishment of connections and encryption) in a network that uses no or weak encryption. The drawback to these solutions is that they only work for new GSM terminals, or require changes to firmware on older terminals, which is often closed source and the companies controlling the firmware may be reluctant to provide updates for older models.

SUMMARY

It is an object of the present invention to provide a solution to one or both of the above attacks and which mitigates the disadvantages of known solutions.

According to an aspect of the present invention, there is provided a method of authenticating a public land mobile network (PLMN) to a mobile station (MS). The PLMN provides a circuit switched access network to the MS, and the MS and a trusted service, TS, have established a security context. The method comprises detecting initiation of a voice call or initiation of sending or receiving of a pushed message by the MS (S10.1) and generating a response authentication token at the TS using a session identifier and the security context (S10.7). The method further comprises sending a response comprising the response authentication token from the TS to the MS such that the response is delivered to the MS over a signalling channel of the PLMN using a mobile subscriber integrated services digital network-number (MSISDN) associated with the subscriber or subscription to direct the message (S10.9). The method further comprises authenticating the response at the MS using the response authentication token, the security context, and the session identifier (S10.12) in order to authenticate the PLMN.

The pushed message may be a short messaging service, SMS, message, or a multimedia messaging service, MMS, message.

The security context may have been established using generic bootstrapping architecture, GBA, or GBA-push.

The session identifier may comprise or be derived from any of:

a timestamp corresponding to the time at which the initiation of a voice call or sending or receiving of a pushed message occurred;

an identifier for a sender or intended recipient of the voice call or pushed message;
a sequence number
a temporary mobile subscriber identifier, TMSI; and
a nonce.
The response may be delivered by one of:
a short message service, SMS, message;
an unstructured supplementary service data, USSD, message;
a multimedia messaging service, MMS, message; and
a general packet radio service, GPRS, data transfer.
The method may comprise any of:
proceeding with initiation of the voice call or sending or receiving of the pushed message only if the PLMN is authenticated (S10.1.1, S10.13);
terminating an already initiated voice call if the PLMN is not considered to be authenticated after a set period of time from the initiation of the voice call;
notifying the user by an audible and/or visual notification that the MS considers the PLMN to be authenticated or unauthenticated (S10.14); and
notifying the user by an audible and/or visual notification if a specified period of time has passed after the initiation of the voice call or sending or receiving of a pushed message and the PLMN is not yet considered authenticated.

The method may comprise generating a request authentication token at the MS using the security context and one or more authentication parameters, the authentication parameters comprising at least a session identifier, sending an authentication request from the MS to the TS, the message comprising the request authentication token and an identifier for a subscriber or subscription associated with the MS, or an identifier of the MS (S10.2) and authenticating the request authentication token at said TS using the security context (S10.4).

The authentication parameter(s) may comprise information identifying the available cryptographic modes of said MS. The step of authenticating the request authentication token may further comprise ascertaining at the TSS the available cryptographic modes of the base station to which said MS is connected (S10.5.1), sending a request to the PLMN to supply information about the security protocol used between said base station and said MS, receiving the response from said request (S10.5.3), and authenticating said authentication parameter(s) using said available cryptographic modes of said base station and said security protocol used (S10.6).

Each authentication token may comprise any of
a message authentication code generated from the authentication parameters or session identifier and the security context;
the authentication parameters or session identifier encrypted using the security context;
a digital signature generated from the authentication parameters or session identifier and the security context.

The authentication parameter(s) may comprise at least one of:
information identifying the subscriber or subscription associated with the MS;
information identifying hardware and/or software of the MS;
information identifying available cryptographic modes of the MS; and information identifying a security protocol used to secure a connection over which the voice call or sending or receiving of the SMS message is to occur.

Further aspects of the present invention include apparatus for carrying out the above method, and methods as performed in those apparatus.

DESCRIPTION

Figure 1:
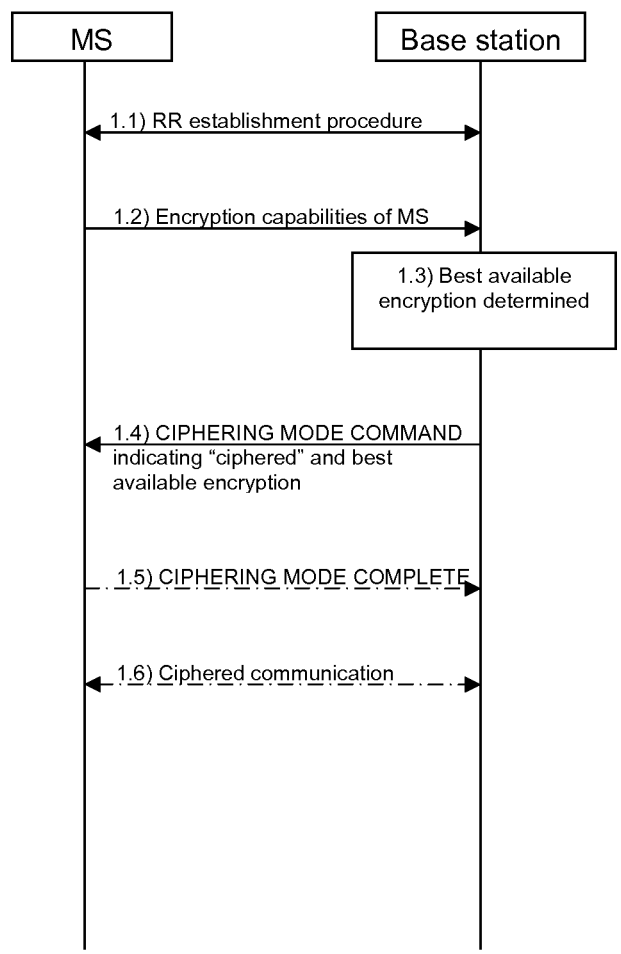
FIG. 1 shows the signalling associated with establishing ciphering for a GSM connection in the usual case.

Methods and apparatus are presented here for detecting false base station attacks, embodiments of which require minimal changes to existing network equipment or terminal hardware, and do not require changes to UICCs (Universal Integrated Circuit Cards) containing the SIM and/or USIM that would require a reissue. The modifications to the mobile terminals can be handled by "over-the-air" management or other download procedures.

The solution described here verifies that an established network connection is with the expected network, and optionally verifies certain properties of the negotiated encryption algorithms. Different embodiments protect against different attacks, but all share a common factor in that the MS and optionally a trusted server are able to verify certain data which an attacker would not be able to "spoof".

To implement the solution, the terminal may run, for example, certain client application software ("app"), which communicates with a trusted service (TS) which runs on a trusted service server (TSS). [The TSS may be a single server, a set of servers, and/or may be implemented by distributing functions of the TS over a set of servers.] The TS in turn communicates with the mobile network. The app and the TS have a shared security context which can be used to communicate securely (e.g. a shared key obtained by the Generic Bootstrapping Architecture (GBA) 3GPP TS 33.220, GBA Push 3GPP TS 33.223, or two public/private key pairs, with each holding one of the private keys) (4.0.1). The data exchanged may communicate information about the MS and the current connection, and is protected using the security context to prevent spoofing and also possibly eavesdropping. The data exchanged also includes a session identifier to protect against replay attacks. The TS sends a signed message to the terminal containing the session identifier. This may be triggered by the MS initiating a voice call, or by an authentication request sent from the MS. The PLMN is considered authenticated by the MS only if this message is received by the MS, and it is accurate and authentic.

The response message from the TSS is transported on the same connection as the sensitive communication, e.g. the voice call, for which assurance of protection is desired. This communication may be via SMS, or some other communication on a signalling layer such as USSD, as these are typically supported concurrently with voice service. SMS also automatically includes information about the MS in the messaging, as the message specifies the MSISDN of the sender. Alternatively, it could be transported using MMS (multimedia messaging system) or parallel GPRS (general packet radio service) data using GSM/GPRS Dual Transfer Mode; however this is not supported by all mobile stations or base stations. In any case, the communication is used to verify that the connection is to an authentic PLMN. Where SMS is used in the below embodiments, this may be substituted for any message sent on a signalling layer. Any message sent by the MS does not have to be sent on a signalling layer of the connection to be verified. However, the message should be sent by some method that is supported concurrently with voice calls. Unless there is an independent network available (e.g. a WiFi connection), the message from the MS will typically be sent by one of the methods listed above.

Figure 2:
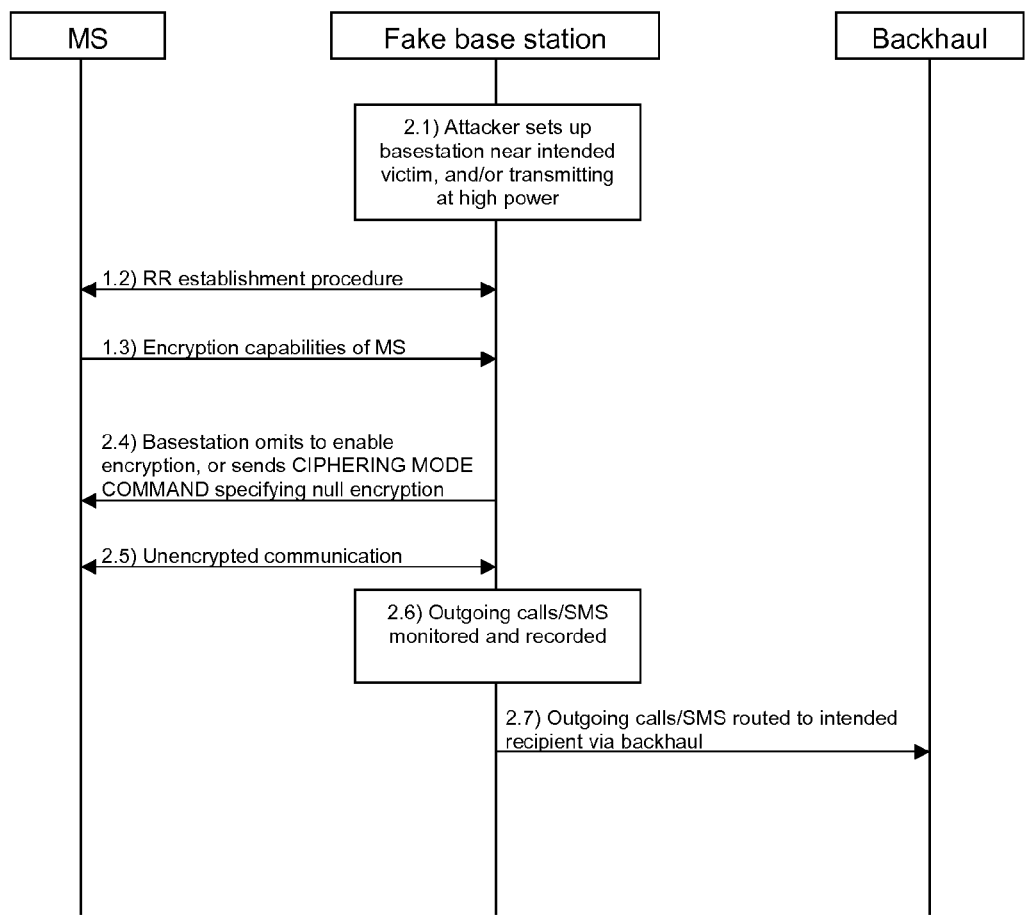
FIG. 2 shows the signalling associated with an attempt to establish ciphering in the "fake network" case.
Figure 4:
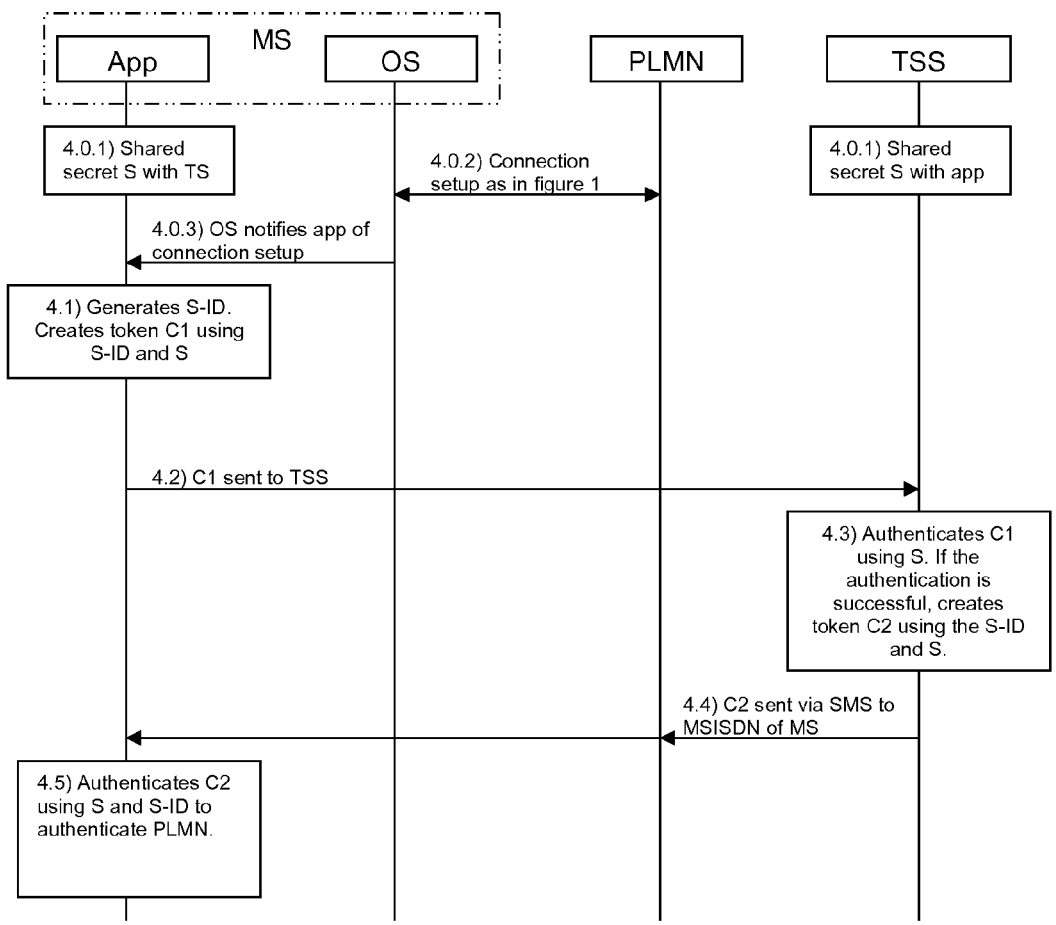
FIG. 4 shows the signalling associated with a first embodiment in which an MS attaches to an authentic base station.
Figure 5:
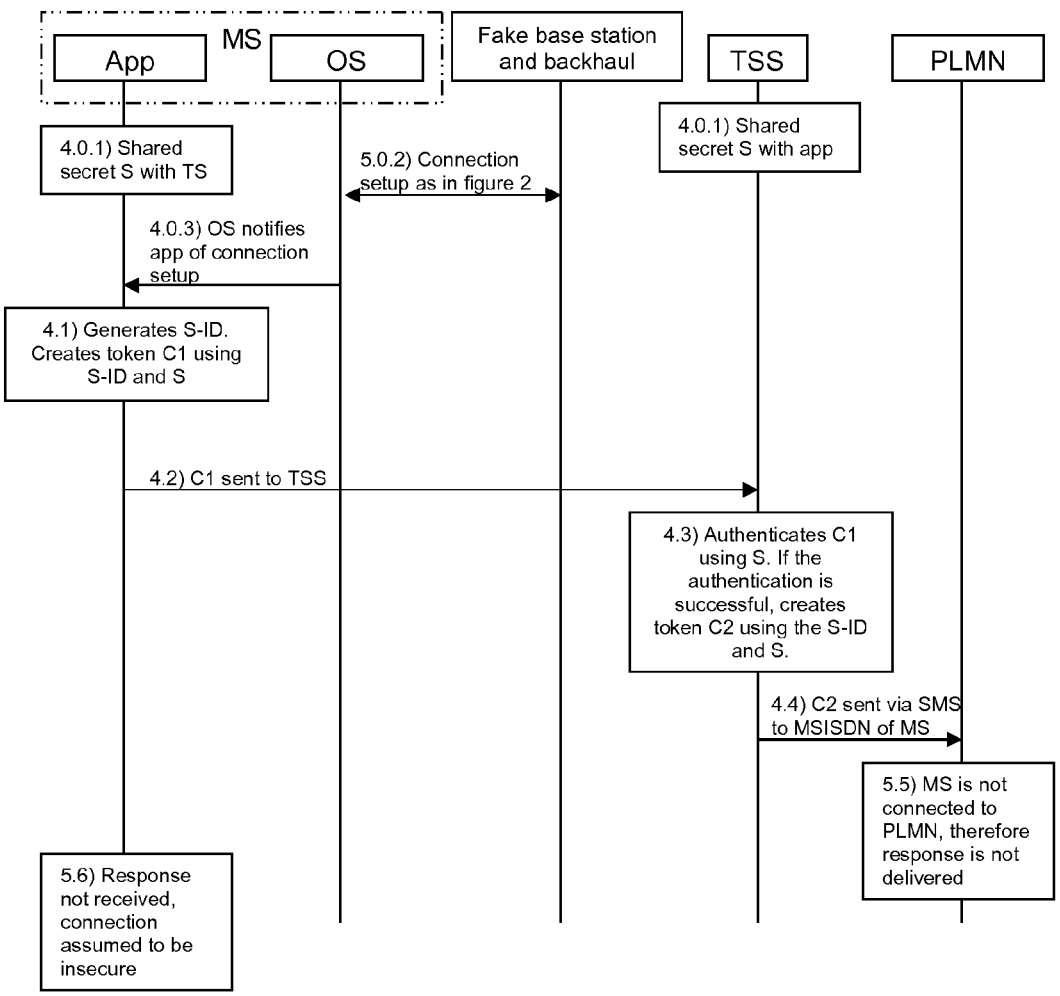
FIG. 5 shows the signalling associated with the first embodiment in the "fake network" case.

A first embodiment is now described which is intended to protect against a fake network attack. This embodiment is described with reference to FIG. 4, showing connection to an authentic network, and FIG. 5, showing connection to a fake network. Assume that a user attempts to make a voice call using the MS, attempts to send a pushed message (such as an SMS or MMS message), or the MS receives a page indicating an incoming voice call or pushed message. After the connection is set up (as in FIG. 1 in the case of connection to a real network (4.0.2), or in FIG. 2 in the case of connection to a fake network (5.0.2)), the operating system (OS) of the MS notifies the app, e.g. by an "off hook" notification (4.0.3). The app generates a session identifier (S-ID). The S-ID and the security context (4.0.1) are then used to generate an authentication token (4.1) which is sent in an authentication request to the TS (4.2). The token may be, for example, the S-ID encrypted using the security context, the S-ID sent with a digital signature, and/or the S-ID sent with a message authentication code for integrity protection. The TS authenticates this message. If the token is correctly authenticated, the TS then compiles generates a response authentication token using the S-ID and security context (4.3), and sends the token in an SMS to the MSISDN of the MS (4.4). Sending to the MSISDN ensures that this is routed via the victim's usual mobile network, meaning that in the case of a fake network attack, the response is not delivered as the victim is not connected to his usual network (5.5). If the app receives a response, and the response is authentic and contains the correct S-ID, the PLMN is considered to be authenticated (4.5): if the app does not receive a response within a reasonable time, the connection is assumed to be insecure (5.6).

Using a session identifier prevents an attacker who had somehow gained access to an SMS sent from the TS to the app on a previous verification from being able to successfully use the SMS to reply to a new authentication request (a "replay attack"). The response sent by the TS should be different from the request sent by the MS, as otherwise the request can be used to spoof the response. This can be achieved, for example, by including different parameters in the messages, or by using different encryption methods for each message.

This first embodiment does not protect against a man in the middle attack (MITM), as such an attack allows incoming SMS and voice calls pass to the MS, and so the fake base station in the MITM case merely needs to relay the messages between the app and the TS to pass verification.

Figure 3:
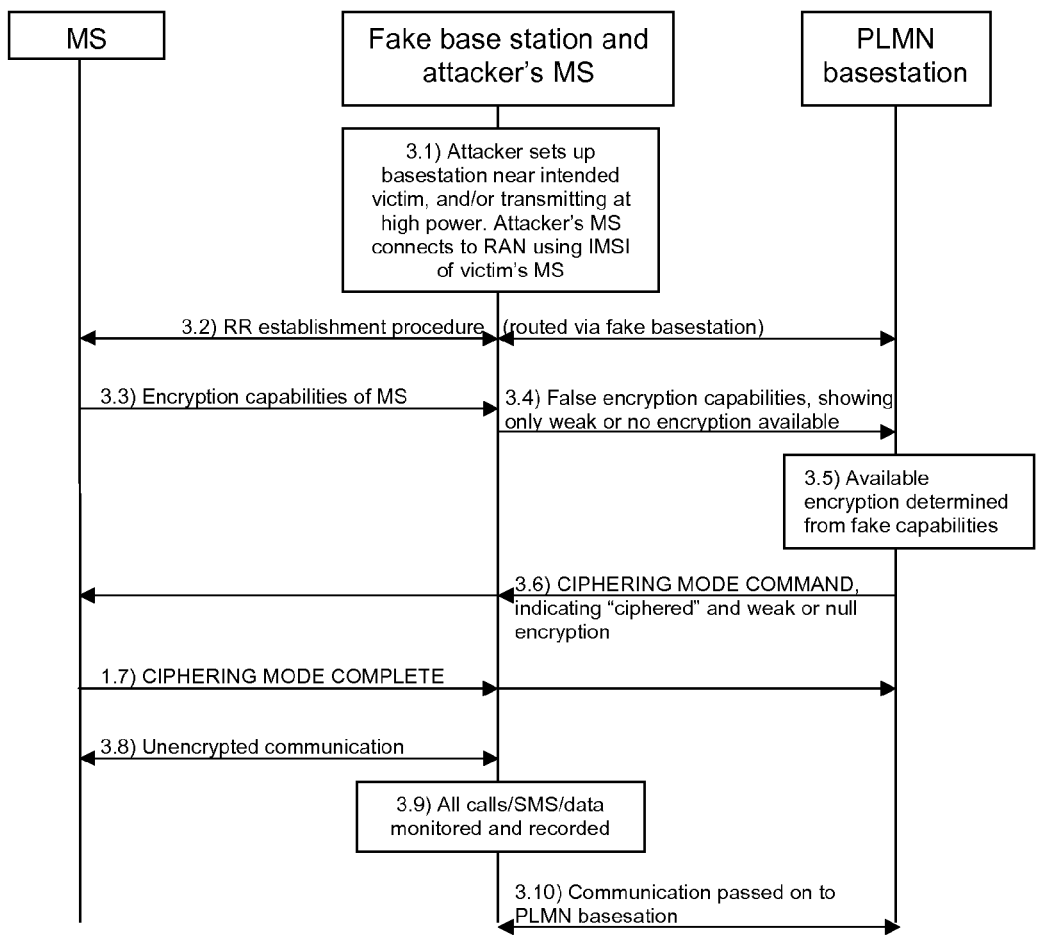
FIG. 3 shows the signalling associated with an attempt to establish ciphering in the "man in the middle" case.
Figure 6:
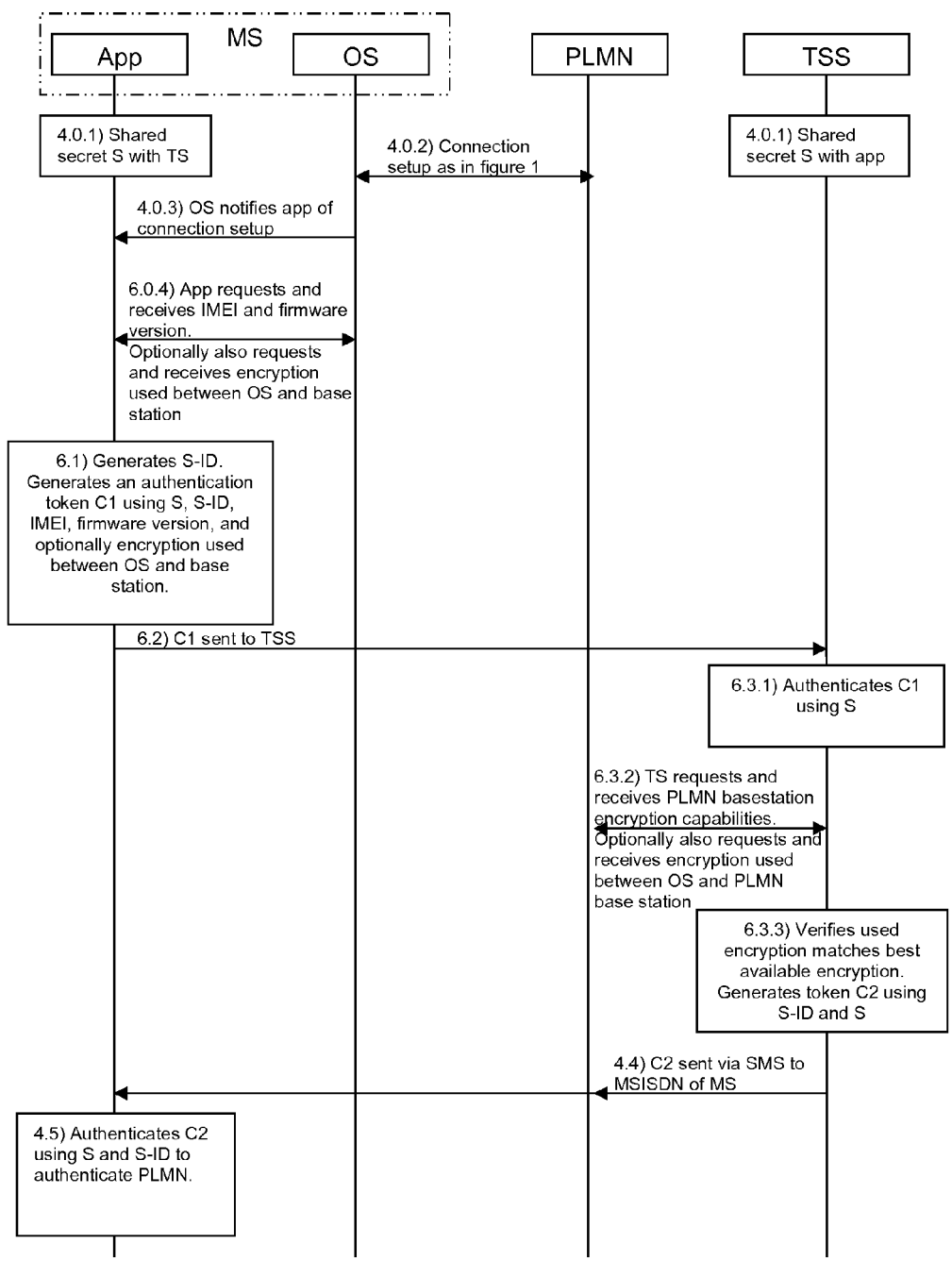
FIG. 6 shows the signalling associated with a second embodiment in which an MS attaches to an authentic base station.
Figure 7:
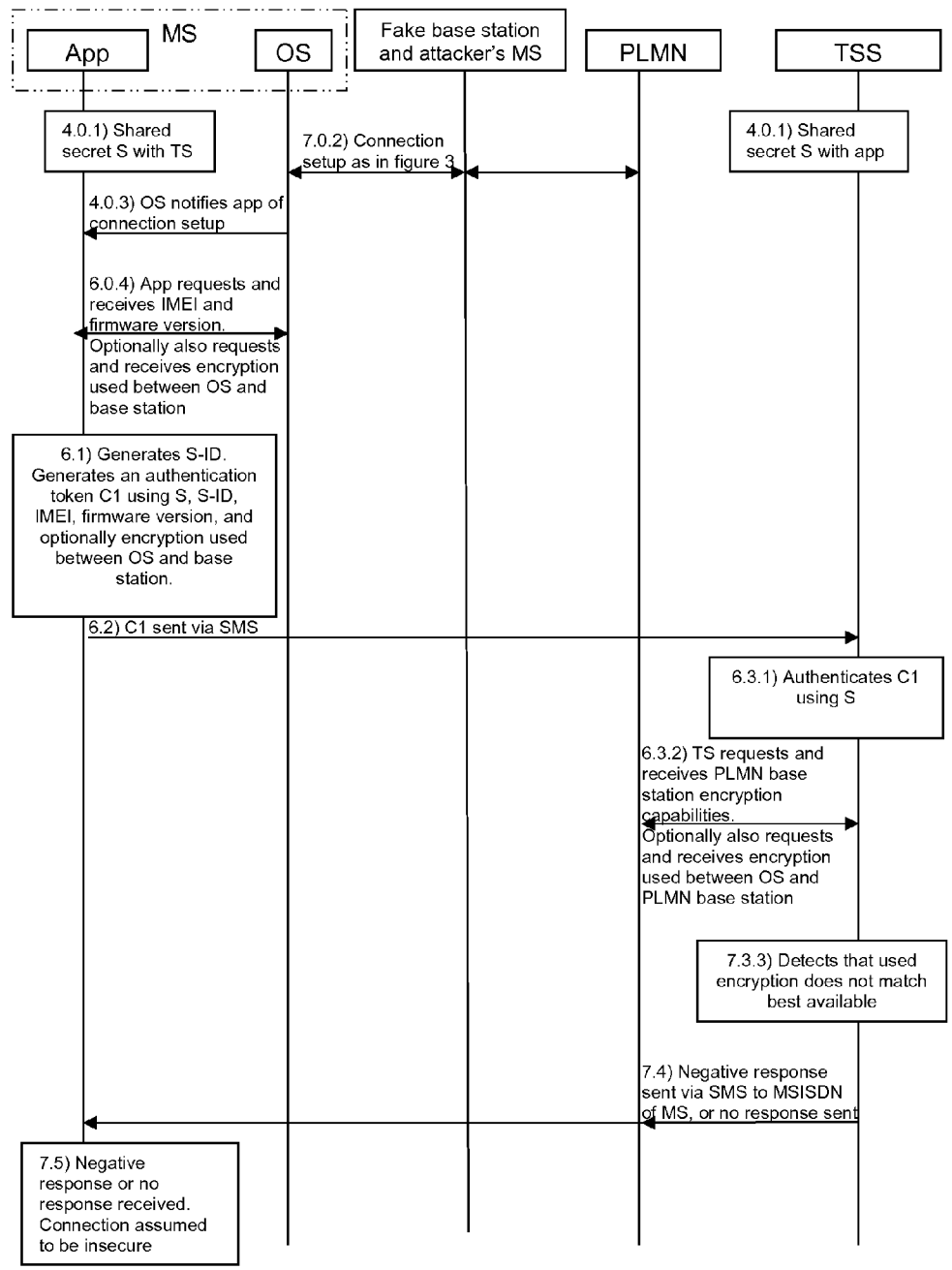
FIG. 7 shows the signalling involved with the second embodiment in the "man in the middle" case.

A second embodiment will now be described which protects against both man in the middle and fake network attacks. FIG. 6 shows the signalling when the network is authentic, and FIG. 7 shows the signalling for a MITM attack. Assume again that the user attempts to make a voice call using the MS, attempts to send a pushed message (such as an SMS or MMS message), or the MS receives a page indicating an incoming voice call or pushed message. After the connection is set up (as in FIG. 1 in the case of connection to a real network (4.0.2), FIG. 2 in the case of connection to a fake network (5.0.2), or FIG. 3 in the case of a man in the middle attack (7.0.2)), the OS notifies the app, e.g. by an "off hook" notification (4.0.3). The app requests the IMEI (or IMEISV) and firmware version from the OS, and optionally also the encryption used between the PLMN and the MS (which would require a new information flow in most terminals) (6.0.4). The IMEI (or IMEISV) and firmware version could also have been provided earlier, and stored by the app for later use. Alternatively, the app could directly request the encryption modes supported by the MS, though this would also require a new information flow in most terminals. The app generates an authentication token using the security context, a session identifier (S-ID), the IMEI (or IMEISV), firmware version, and encryption used (if known). The authentication token is sent to the TS (6.2).

The TS, upon receiving the token, authenticates it using the security context (6.3.1). The TS then requests from the PLMN the encryption capabilities of the base station that the MS is connected to. The TS also requests the encryption used between the PLMN and MS if this information was not included in the token (6.3.2). If the MS is not connected to the PLMN, then this is indicative of a fake network attack, and the TS may not send a response to the MS, causing the MS to assume that the connection is insecure (7.5). The TS then determines the encryption capabilities of the MS from the IMEI and firmware version, and compares this with the encryption capabilities of the base station to determine the best available encryption. This is compared with the actual encryption used as reported by the PLMN or the OS, and if the encryption used matches the best available encryption, and the message from the MS was successfully decrypted (6.3.3) the TS generates a response authentication token using the S-ID and the security context, and sends the token by SMS to the MSISDN of the MS (4.4). As before, this will not be delivered successfully in the fake network scenario (7.5).

If the TS determines that the used encryption does not match the best possible encryption (7.3.3), then it either sends an SMS indicating a negative result to the MSISDN of the MS, or does not send a response (7.4). If the app receives a message which can be authenticated using the security context and S-ID, then the PLMN is considered to be authentic (4.5). If the app receives a message containing a negative response, or no response within a reasonable period of time, then the connection is assumed to be insecure (7.5).

Additionally, the request authentication token could include a hash of the ciphering key, Kc, of the encryption between the MS and the base station to allow the TS to ensure that the correct key is being used. This requires the TS and the app to be trusted by the MNO to receive such data, and new information flows to be set up between the TS and the MNO, and the MS and the app.

In either the first or second embodiment the app could also report information identifying the subscriber or subscription associated with the MS (such as the IMSI or MSISDN), included in the token, or concatenated with it. Having it in the token means it can be used to verify that the request is genuine, for example as a protection against denial of service attacks that aim to flood the TS with requests that it must process, as these can be discarded if there is not an IMSI corresponding to the sender or signature. Having it outside the token may be necessary if the authentication request is sent by some other method than SMS, in order to identify the subscriber or subscription. This happens by default for SMS, as the SMS signalling includes information about the sender. This may also be true for other signalling methods.

Figure 11:
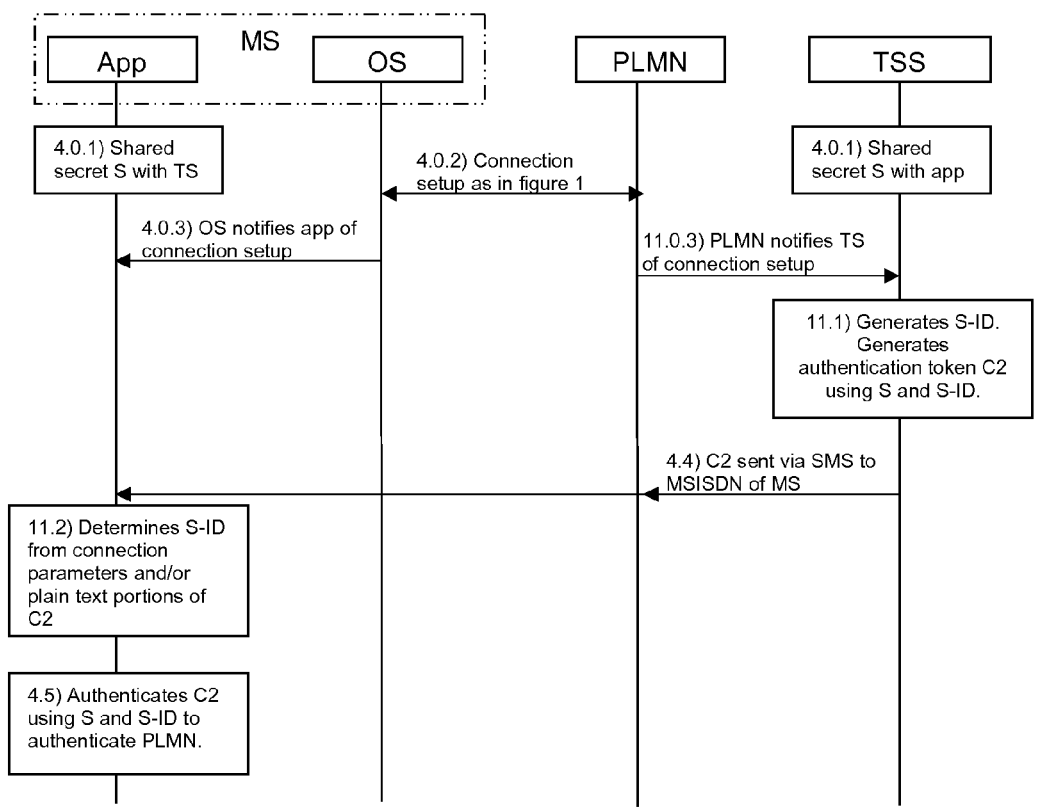
FIG. 11 shows the signalling associated with a third embodiment in which an MS attaches to an authentic basestation.

A third embodiment will now be described in which signalling is only required from the TS to the MS. The signalling for this embodiment is shown in FIG. 11.

The user attempts to make a voice call using the MS, attempts to send a pushed message (such as an SMS or MMS message), or the MS receives a page indicating an incoming voice call or pushed message. A connection is set up as in FIG. 1 (4.0.2).

The mobile network detects this connection, and notifies a TS (11.0.3). The TS generates a response authentication token using a session identifier and the security context (11.1). The response authentication token is sent by SMS to the MSISDN of the MS as before (4.4).

The session identifier can include information known to both the PLMN and MS, such as the temporary mobile subscriber identifier, TMSI, a timestamp for the time of initiation of the voice call or sending of a pushed message, the sender and intended recipient of the voice call or pushed message, etc. This information will be communicated to the TS from the PLMN. The authentication token may include the session identifier in plain text along with an encryption or hash of the session identifier using the security context. In this case, a nonce (a number or bit string used only once) or other value included in the session identifier can be used to authenticate the response authentication token. In any case, the session identifier should include some data that is unique to the session, to ensure that the authentication token is different on each authentication attempt and prevent replay attacks.

Upon receipt of the response authentication token, the MS authenticates the token using the security context, and any available information on the components of the session identifier (11.2, 4.5). In a fake network scenario, the authentic mobile network will not detect the voice call or pushed message, and so the message from the TS will not be sent. If the MS receives an authentic authentication token, then the PLMN is considered to be authentic. If the MS does not receive an authentication token within a reasonable time, then the connection is assumed to be insecure. By including information about encryption algorithms used by the PLMN in the pushed message, and making the MS verify that the algorithms used are correct, this method also protects against the man in the middle attack.

In this embodiment, the message transport to the MS may be an implementation of the Generic Push Layer, GPL, architecture 3GPP TS 33.224.

Optional elements that apply to either embodiment include the following:

The session identifier may be a nonce, a timestamp, or some other value provided that it is unique for every authentication attempt.

The session identifier may be complemented with other identifying data such as an identifier for the sender and/or intended recipient of the message.

The security context may include a cryptographic key known to both the MS and the TSS. Alternatively, the security context may include two asymmetric key pairs, with the MS having the private key of the first key pair and the public key of the second key pair, and the TSS having the public key of the first key pair, and the private key of the second key pair.

If the app is more closely integrated with the operating system of the MS, the app could operate such that until the connection is authenticated, some or all CS and/or IP traffic is blocked for user applications, and those system applications not necessary to establish encryption or perform the verification (and others such as emergency call functions). Such a solution would protect communications from the device, at the expense of a reduction in usability. This blocking could be notified to the user by an audible notification during voice calls, and once the connection is authenticated, the call would proceed normally. Alternatively, upon receipt of a negative response, or after a reasonable time has passed with no response, an already established voice call could be terminated.

The app may signal the authentication state to the user via audible and/or visual notifications, for example a tone could play during a call once the connection is authenticated, and a distinguishable tone if the verification does not succeed (either by the receipt of a negative response, or no response within a reasonable time).

Figure 8:
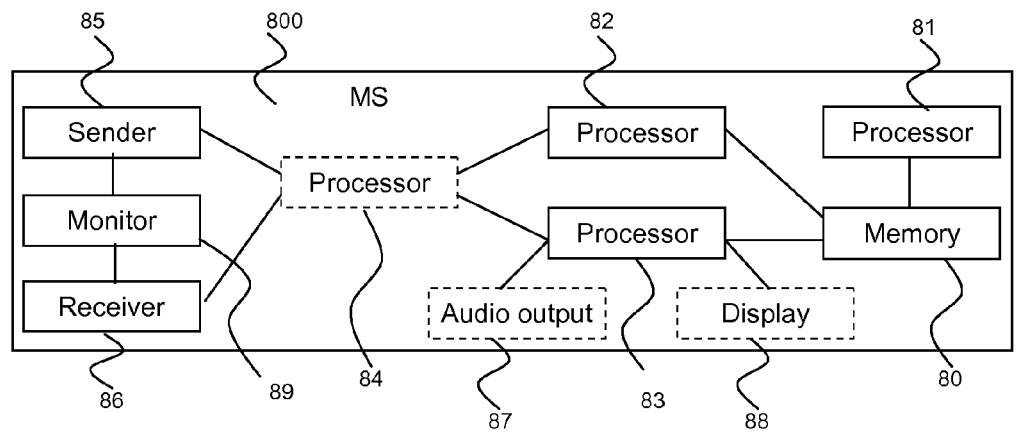
FIG. 8 illustrates schematically an example of a mobile station, MS.

FIG. 8 illustrates schematically an MS (800) suitable for implementing the solutions presented here. The MS (800) comprises a memory (80) for storing a shared security context between the MS and TS. A communications monitor (89) is configured to detect the initiation of voice calls or initiation of sending or receiving of pushed messages. A receiver (86) is configured to receive a response from the TS over a signalling channel of a communication routed through the PLMN (e.g. an SMS during a voice call) (S10.10), and a first processor (83) is configured to authenticate a response authentication token contained in the response using a session identifier and security context (S10.12).

For a two-way authentication protocol such as in the first and second embodiments, the MS comprises further components. A second processor (81) is configured to determine the session identifier (80). The session identifier could, for example, be a nonce, or a timestamp, and the second processor (81) will be configured accordingly. The MS comprises a third processor (82) for generating a request authentication token using the security context, a session identifier, and possibly other parameters, and a sender (85) for sending the token to the TS (S10.2).

The MS may comprise a fourth processor (84) configured to restrict traffic through the sender (85) and receiver (86) until the first processor (83) has verified the response from the TS (S10.3). The MS may comprise a display (88) and/or an audio output (87) for notifying the user that the PLMN has or has not been authenticated (S10.14).

Figure 9:
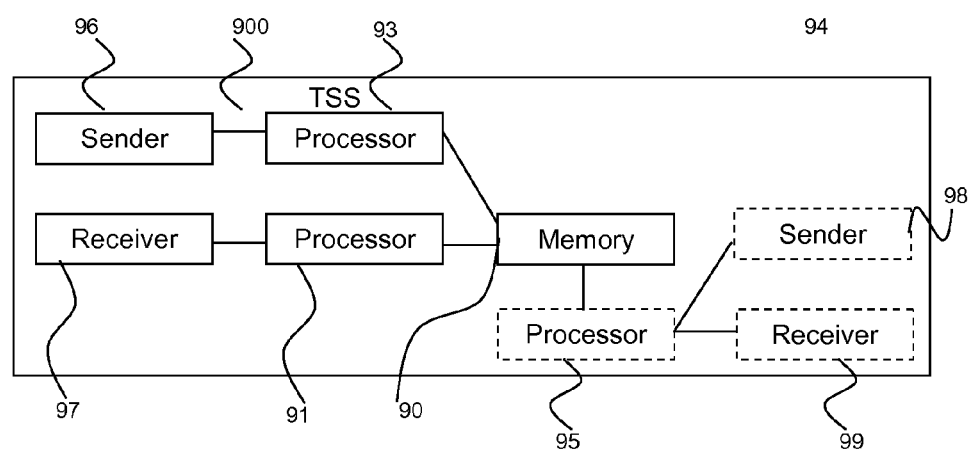
FIG. 9 illustrates schematically an example of a trusted service server, TSS.
Figure 10:
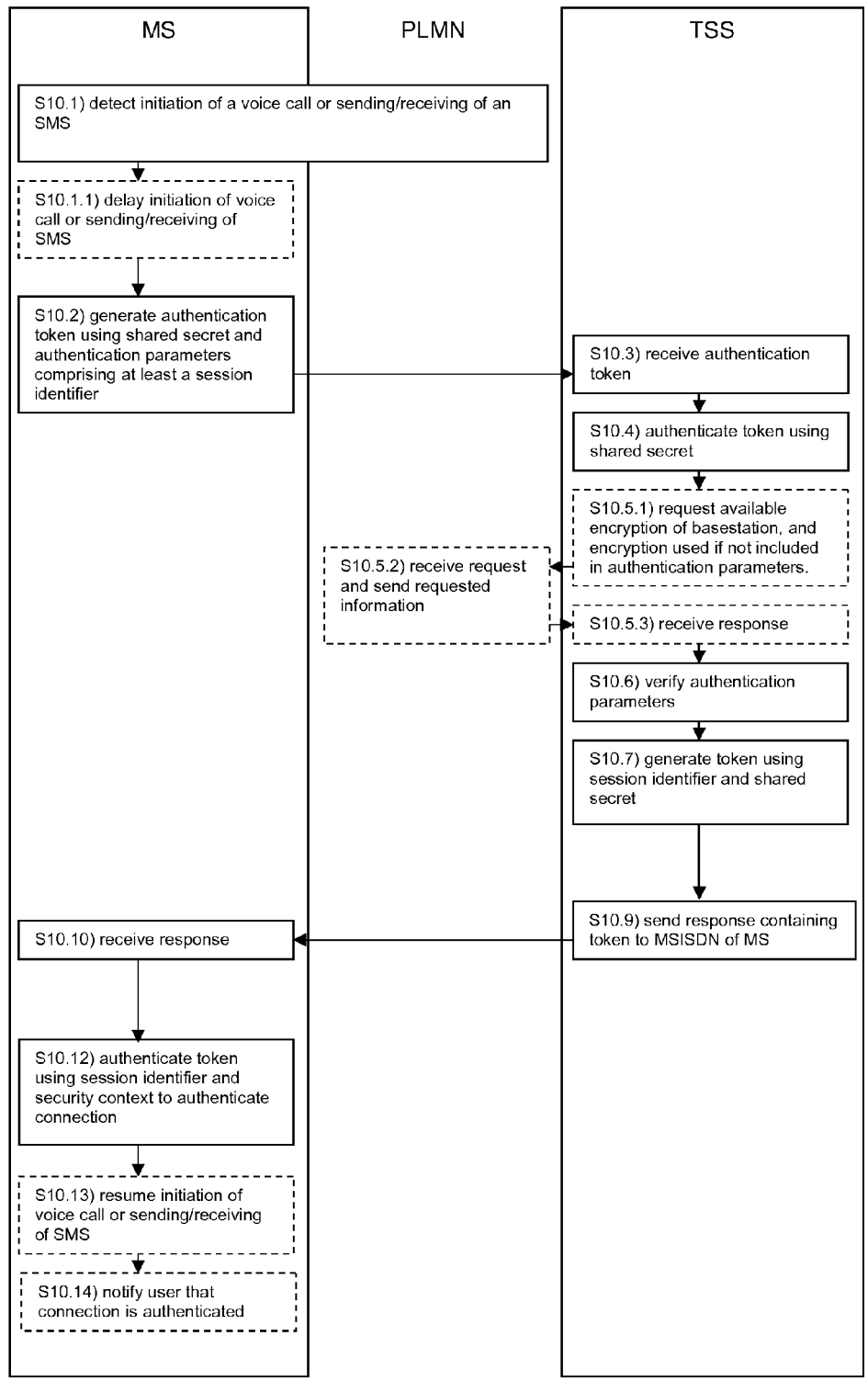
FIG. 10 is a flowchart, illustrating the method of the first and second embodiments.

FIG. 9 illustrates schematically a TSS (900) suitable for implementing the presented solutions. The TSS (900) comprises a memory (90) for storing a database containing details of mobile stations, and security contexts and MSISDNs associated with those mobile stations. The TSS (900) comprises a receiver (97) for receiving an authentication request comprising an identifier of a subscriber or subscription associated with an MS. A first processor (93) is configured to generate a response token using the session identifier and security context (S10.7), and a sender (96) is configured to send the token such that it is delivered to the MS over a signalling channel using the MSISDN associated with the mobile station to address the message (S10.9).

For a two way authentication protocol such as in the first and second embodiments, the TSS comprises additional components. In such a protocol, the authentication request comprises a request authentication token (S10.3), the authentication token comprising one or more authentication parameters including at least the session identifier. The TSS comprises a second processor (91) for authenticating the request authentication token using the security context (S10.4). The TSS (900) may comprise a second sender (98) for sending a request to the PLMN to which the mobile station is connected requesting the available encryption modes of the base station to which the mobile station is connected and optionally the encryption currently in use (S10.5.1), a second receiver (99) for receiving a response to this request (S10.5.3), and a third processor (95) for determining the best available encryption from the encryption modes of the base station and the encryption modes of the mobile station (contained in the request token), and verifying that this matches the encryption used (either obtained from the PLMN, or contained in the request token).

The MS or the TSS may be incorporated into a vessel or vehicle.

It will be appreciated by the person skilled in the art that various modifications may be made to the above described embodiments without departing from the scope of the present invention as defined by the appended claims. For example, it will be readily apparent that although the above embodiments refer to an "app", the functionality could be included in the hardware and firmware of new devices, or integrated into the operating system. In addition, neither the problem nor the solution is necessarily limited to GSM networks; it may apply to other networks, and may apply to future networks if their specification does not include a way for the mobile station to authenticate the base station (or equivalent). In the embodiments described above it is assumed that the "user" of the MS is a human user. However, this need not be the case and the "user" may be a machine, e.g. an automatic unit.

The invention claimed is:

1. A method carried out in a mobile station, MS, to authenticate a public land mobile network, PLMN, to the MS, where the MS is attached to a circuit switched access network of the PLMN and the MS has established a security context with a trusted service, TS, the method comprising:
   a) detecting initiation of a voice call or initiation of sending or receiving of a pushed message by the MS;
   b) in response to a), receiving a response from the TS over a signalling channel, the response containing a response authentication token; and
   c) authenticating the response using the response authentication token, the security context and a session identifier in order to authenticate the PLMN.

2. The method according to claim 1, wherein said pushed message is a short messaging service, SMS, message, or a multimedia messaging service, MMS, message.

3. The method according to claim 1, wherein said security context has been established using generic bootstrapping architecture, GBA, or GBA-push.

4. The method according to claim 1, and comprising, prior to step b):
   generating a request authentication token using the security context and one or more authentication parameters, the authentication parameters comprising at least the session identifier; and
   sending an authentication request comprising the request authentication token and an identifier for a subscriber or subscription associated with the MS, or an identifier of the MS, to the trusted service, TS.

5. The method according to claim 4, wherein the request authentication token or the response authentication token comprises any of:
   a message authentication code generated from the authentication parameters and the security context;
   the authentication parameters encrypted using the security context; and
   a digital signature generated from the authentication parameters and the security context.

6. The method according to claim 4, wherein said authentication parameter(s) comprise at least one of:
   information identifying the subscriber or subscription associated with the MS;
   information identifying hardware and/or software of the MS;
   information identifying available cryptographic modes of the MS; and
   information identifying a security protocol used to secure a connection over which the voice call or sending or receiving of the SMS message is to occur.

7. The method according to claim 4, wherein the session identifier comprises or is derived from any of:
   a timestamp corresponding to the time at which the initiation of the voice call or sending or receiving of the pushed message occurred;
   an identifier for a sender or intended recipient of the voice call or pushed message;
   a sequence number;
   a temporary mobile subscriber identifier, TMSI; and
   a nonce.

8. The method according to claim 1 and comprising at least one of:
   proceeding with initiation of the voice call or sending or receiving of the pushed message only if the PLMN is authenticated;
   terminating an already initiated voice call if the PLMN is not considered to be authenticated after a set period of time from the initiation of the voice call;
   notifying the user by an audible and/or visual notification that the MS considers the PLMN to be authenticated or unauthenticated; and
   notifying the user by an audible and/or visual notification if a specified period of time has passed after the initiation of the voice call or sending or receiving of a pushed message and the PLMN is not yet considered authenticated.

9. The method according to claim 1, wherein the received response is one of:
   a short message service, SMS, message;
   an unstructured supplementary service data, USSD, message;

a multimedia messaging service, MMS, message; and
a general packet radio service, GPRS, data transfer.

10. A method in a trusted service server, TSS, the TSS having a security context, the method comprising:
receiving an authentication request comprising an identifier for a subscriber or subscription associated with a mobile station, MS;
generating a response authentication token using a session identifier and the security context; and
sending a response message comprising the response authentication token to the MS such that the response message is delivered to the MS over a signalling channel of a circuit switched access network of a public land mobile network, PLMN, using a mobile subscriber integrated services digital network-number, MSISDN, associated with the subscriber.

11. The method according to claim 10, wherein the authentication request comprises a request authentication token, the authentication token comprising one or more authentication parameters including at least the session identifier; the method comprising:
authenticating the request authentication token using the security context.

12. The method according to claim 11, wherein said step of authenticating further comprises:
sending a request to said PLMN containing an identifier of the subscriber or subscription;
receiving from the PLMN a response comprising information identifying available cryptographic modes of the PLMN and optionally identifying a security protocol used to secure the connection between the PLMN and the MS; and
authenticating said response authentication token using said response from the PLMN.

13. The method according to claim 10, wherein the response authentication token comprises any of:
a message authentication code generated from the security context and the session identifier;
the session identifier encrypted using the security context; and
a digital signature generated from the security context and the session identifier.

14. A method of authenticating a public land mobile network, PLMN, to a mobile station, MS, the PLMN providing a circuit switched access network to the MS, wherein the MS and a trusted service, TS, have established a security context, the method comprising:
detecting initiation of a voice call or initiation of sending or receiving of a pushed message by the MS;
generating a response authentication token at the TS using a session identifier and the security context;
sending a response message comprising the response authentication token from the TS to the MS such that the response message is delivered to the MS over a signalling channel of the PLMN using a mobile subscriber integrated services digital network-number, MSISDN, associated with the subscriber or subscription to direct the response message; and
authenticating the response message at the MS using the response authentication token, the security context, and the session identifier in order to authenticate the PLMN.

15. The method according to claim 14, wherein the session identifier comprises or is derived from any of:
a timestamp corresponding to the time at which the initiation of the voice call or sending or receiving of the pushed message occurred;
an identifier for a sender or intended recipient of the voice call or pushed message;
a sequence number;
a temporary mobile subscriber identifier, TMSI; and
a nonce.

16. The method according to claim 14, wherein said response message is delivered by one of:
a short message service, SMS, message;
an unstructured supplementary service data, USSD, message;
a multimedia messaging service, MMS, message; and
a general packet radio service, GPRS, data transfer.

17. The method according to claim 14 and comprising any of:
proceeding with initiation of the voice call or sending or receiving of the pushed message only if the PLMN is authenticated;
terminating an already initiated voice call if the PLMN is not considered to be authenticated after a set period of time from the initiation of the voice call;
notifying a user by an audible and/or visual notification that the MS considers the PLMN to be authenticated or unauthenticated; and
notifying the user by an audible and/or visual notification if a specified period of time has passed after the initiation of the voice call or sending or receiving of the pushed message and the PLMN is not yet considered authenticated.

18. The method according to claim 14, wherein said pushed message is a short messaging service, SMS, message, or a multimedia messaging service, MMS, message.

19. The method according to claim 14, wherein said security context has been established using generic bootstrapping architecture, GBA, or GBA-push.

20. The method according to claim 14, and comprising:
generating a request authentication token at the MS using the security context and one or more authentication parameters, the authentication parameters comprising at least a session identifier;
sending an authentication request message from the MS to the TS, the authentication request message comprising the request authentication token and an identifier for a subscriber or subscription associated with the MS, or an identifier of the MS; and
authenticating the request authentication token at said TS using the security context.

21. The method according to claim 20, wherein said authentication parameter(s) comprise information identifying available cryptographic modes of said MS, and wherein said step of authenticating the request authentication token further comprises:
ascertaining at the TSS the available cryptographic modes of the base station to which said MS is connected;
sending a request to the PLMN to supply information about the security protocol used between said base station and said MS;
receiving a response for said request; and
authenticating said authentication parameter(s) using said available cryptographic modes of said base station and said security protocol used.

22. The method according to claim 14, wherein each authentication token comprises any of:
a message authentication code generated from the authentication parameters or session identifier and the security context;
the authentication parameters or session identifier encrypted using the security context; and a digital signature generated from the authentication parameters or session identifier and the security context.

23. An apparatus configured to operate as a mobile station in a public land mobile network, PLMN, the apparatus comprising:
 a memory for storing a shared security context between the mobile station and a trusted service server, TSS;
 a communications monitor for detecting initiation of a voice call or sending or receiving of a pushed message by the mobile station;
 a receiver for receiving a response from said TSS via a signalling channel, the response comprising a response authentication token; and
 a first processor for authenticating the response authentication token, the security context and a session identifier in order to authenticate the PLMN.

24. The apparatus according to claim 23, and comprising:
 a second processor for determining the session identifier;
 a third processor for generating a request authentication token using the security context and one or more authentication parameters, the authentication parameters comprising at least the session identifier; and
 a sender for sending a message to said TSS, the message comprising the request authentication token.

25. The apparatus according to claim 23, comprising a fourth processor configured to restrict traffic through said sender and said receiver until the PLMN is authenticated.

26. The apparatus according to claim 23, and comprising a display and/or audio output for providing an indicator of whether or not the PLMN is authenticated.

27. An apparatus configured for communication with a public land mobile network, PLMN, and comprising:
 a memory for storing a database comprising details of one or more mobile stations, security contexts shared between said apparatus and said one or more mobile stations, and mobile subscriber integrated services digital network-numbers, MSISDNs, associated with said one or more mobile stations;
 a receiver for receiving an authentication request comprising an identifier of a subscriber or subscription associated with a mobile station, MS;
 a first processor generating a second authentication token using a session identifier and the security context; and
 a first sender for sending a response message comprising the second authentication token to the MS such that the response message is delivered to the MS over a signalling channel of a circuit switched access network of a public land mobile network, PLMN, using the MSISDN associated with the subscriber.

28. The apparatus according to claim 27, wherein the authentication request comprises a request authentication token, the request authentication token comprising one or more authentication parameters including at least the session identifier; the apparatus comprising:
 a second processor for authenticating the request authentication token using the security context.

29. The apparatus according to claim 28, and comprising:
 a second sender for sending a request to the public land mobile network to which said MS is connected requesting the available cryptographic modes of said base station and optionally the security protocol used between the base station to which said MS is connected and the MS;
 a second receiver for receiving a response from said public land mobile network containing the information requested; and
 a third processor for authenticating said authentication parameter(s) using said available cryptographic modes of said base station and the security protocol used.

30. A non-transitory computer-readable medium storing a computer program comprising computer program instructions that, when executed by a processor of a mobile station, MS, configures the MS to authenticate a public land mobile network, PLMN, to the MS, where the MS is attached to a circuit switched access network of the PLMN and the MS has established a security context with a trusted service, TS, said computer program instructions including instructions configuring the MS to:
 a) detect initiation of a voice call or initiation of sending or receiving of a pushed message by the MS;
 b) in response to a), receive a response from the TS over a signalling channel, the response containing a response authentication token; and
 c) authenticate the response using the response authentication token, the security context and a session identifier in order to authenticate the PLMN.

31. A non-transitory computer-readable medium storing a computer program comprising computer program instructions that, when executed by a processor of a Trusted Service Server, TSS, having a security context configures the TSS to:
 receive an authentication request comprising an identifier for a subscriber or subscription associated with a mobile station, MS;
 generate a response authentication token using a session identifier and the security context; and
 send a response message comprising the response authentication token to the MS such that the response message is delivered to the MS over a signalling channel of a circuit switched access network of a public land mobile network, PLMN, using a mobile subscriber integrated services digital network-number, MSISDN, associated with the subscriber.

* * * * *